Jan. 12, 1960 R. E. GRAHAM 2,921,124

METHOD AND APPARATUS FOR REDUCING TELEVISION BANDWIDTH

Filed Dec. 10, 1956 5 Sheets-Sheet 1

INVENTOR
R. E. GRAHAM
BY Harry C. Hart
ATTORNEY

INVENTOR
R. E. GRAHAM
BY Harry C. Hart
ATTORNEY

Jan. 12, 1960 R. E. GRAHAM 2,921,124

METHOD AND APPARATUS FOR REDUCING TELEVISION BANDWIDTH

Filed Dec. 10, 1956 5 Sheets-Sheet 3

INVENTOR
R. E. GRAHAM
BY Harry C. Hart
ATTORNEY

Jan. 12, 1960 R. E. GRAHAM 2,921,124

METHOD AND APPARATUS FOR REDUCING TELEVISION BANDWIDTH

Filed Dec. 10, 1956 5 Sheets-Sheet 4

INVENTOR
R. E. GRAHAM
BY Harry C. Hart
ATTORNEY

INVENTOR
R.E.GRAHAM
BY Harry C. Hart
ATTORNEY

United States Patent Office 2,921,124

Patented Jan. 12, 1960

2,921,124

METHOD AND APPARATUS FOR REDUCING TELEVISION BANDWIDTH

Robert E. Graham, Chatham Township, Morris County, N.J., assignor to Bell Telephone Laboratories, Incorporated, New York, N.Y., a corporation of New York Application December 10, 1956, Serial No. 627,266

16 Claims. (Cl. 178—6)

This invention relates to the processing of electrical communication signals and more particularly to the transmission and reception of signals of the type which ordinarily require considerable transmission channel capacity.

In order to ensure faithful reproduction at the receiver of the entire range of frequencies and amplitudes contained in communication signals, for example, television signals, many communication systems employ broad band transmission channels. It can be shown that many of these systems employ a channel capacity greater than that required to send an amount of information actually necessary to describe a message. Since most communication signals are not random, but exhibit a considerable degree of correlation which may be, for example, semantic, spatial (television, for example), chronologic and so on, a considerable increase in transmission efficiency is possible by taking advantage of one or more of these correlations.

For example, the correlation present in small picture regions in most television scenes makes possible the prediction of the future of the signal in terms of its past. If the method used for prediction makes full use of the entire pertinent past, then an error signal equivalent to the difference between the actual and the predicted signal is a completely random wave of lower average power than the original signal, but which nevertheless contains all of the information of the original signal. In order to realize a substantial saving in channel capacity, however, the lower-power error signal must be expressed in a variable length or run-length binary code prior to transmission. Such an encoding procedure requires complex terminal equipment.

Another system for reducing channel capacity requirements for the transmission of a signal wave consisting of a series of signal segments following each other in time sequence involves transmitting only a fraction of the total number of message segments available. Preferably, each of the selected segments is stretched in the time dimension to fill the gap left in the wave train by the elimination of the number of segments. At the receiving station, the wave is restored to its original dimension in time, and the blank intervals are filled in by reading out each received portion successively the appropriate number of times. A system of this general sort is fully described in Patent 2,115,803 granted May 3, 1938 to H. W. Dudley. Although a system of discarding and stretching makes possible, theoretically at least, any desired reduction in bandwidth, the reduction is at the expense of total information. Hence, when two out of each group of three successive message periods are eliminated at the transmitter, the transmission band can, in principle, be reduced by a factor of three. The price paid for this sort of bandwidth economy is a resulting increase in the abruptness with which the waveform of each group of periods changes with respect to that of the next such group. Such an abrupt signal discontinuity is a severe impairment to the reproduced signal output, and is particularly objectionable in television.

Still another system which has been discussed for reducing channel capacity requirements is one involving signal quantization. Particularly in the field of pulse code modulation, quantization of the signal amplitude to a number of predetermined amplitude levels becomes desirable. However, unless a relatively large number of quantizing levels are employed, any gradual change in brightness across the picture will appear as a series of discrete steps so that there will be annoying brightness contours visible in the picture. In addition, where in the picture there is a large area having a uniform brightness level near the limit of one quantizing level, a small amount of noise may shift the amplitudes of random samples of the picture signal into the next quantizing level giving rise to defects in the picture which can be quite disturbing to the viewer. It is necessary, therefore, to quantize at a sufficiently large number of levels to prevent these picture defects from becoming intolerable to the viewer. Coupled with the increase in the number of quantizing levels employed is a substantial increase in complexity of the associated terminal equipment necessary to encode the quantized signal.

Another obstacle to the realization of channel economy in the above-mentioned system is the presence of random noise in the signal. As an example of how inherent noise in the input signal of such a system limits the possible benefits of correlation, a white thermal noise having an R.M.S. value equal to a quantum step will prevent the required channel capacity from dropping below 2 bits per sample, no matter how predictable may be the noise-free component of the input signal. Since the general objective of the above-mentioned system is to provide a faithful transmission of whatever signal it is given, whether noisy or not, the encoding process is actually more difficult than for a noise-free signal, and the encoders employed necessarily become very complex.

Accordingly, it is the principal object of the present invention to reduce the channel capacity required of communication systems by reducing the redundancy in the signals which are transmitted in a manner such that quantizing or complex encoding techniques become unnecessary.

It is another broad object of the invention to improve the fidelity and quality of a reproduced signal by accurately interpolating the received portion of the signal thereby to produce an accurate reconstruction of the original signal on the basis of data available in the received portions of the signal.

The present invention, in one of its more important aspects, relates to a system for reducing the channel capacity required for the transmission of a signal wave train consisting of a continuous succession of signal periods wherein certain preselected signal periods are discarded prior to transmission. The retained periods are transmitted to a receiving station unencoded, preferably after stretching each one in time to fill the gap left in the wave train by the elimination of certain periods. Such stretching carries with it a corresponding reduction in the frequency band required for transmission. At the receiving station the received wave is restored to its original dimension in time to produce a facsimile of the transmitted wave including the blank intervals corresponding to the eliminated periods. In accordance with the invention, signal interpolation is employed to produce, solely from information in the received signal, a signal value equivalent to the period discarded prior to transmission. This signal is subsequently intercalated with the received periods to yield a substantial replica of the original signal. This technique relies for its effectiveness on the aforementioned correlation which is found to exist in substantially all communication signals.

In one simple illustrative arrangement of the invention, invariant linear interpolation is used to reconstruct the missing periods of the received signal, but in a preferred embodiment variant linear interpolation is employed. Interpolation is linear in the sense that a derived signal value is a linear function of the received signal data, and it is variant in that the method or rule controlling the interpolation varies with time and the signal. More particularly, variant interpolation involves an examination of the received portions of the signal to determine the trend of change in the signal on the basis of preceding periods, for example, previous periods on the same line of a television picture, or from prior lines or prior frames. On the basis of this examination an interpolation fill-in value is produced. The overall operation is, therefore, a nonlinear one.

In a preferred embodiment of the invention, a variety of relatively simple modes of interpolation are employed, the choice of which mode to be used for any particular signal period being based on a fixed rule, for example, a determination of the direction of constant brightness contour lines in the vicinity of the omitted period. By judiciously choosing the best mode at any particular point, that is, by causing the mode of interpolation to vary dynamically from point to point within the picture in dependence on the nature of the local picture environment, an output signal is produced that is either substantially identical to or a pleasing approximation to the original signal.

In one simple embodiment of the invention, the original signal to be transmitted is sampled at a much lower than normal sampling rate, for example, one half of the theoretically required rate, to create a pulse amplitude-modulated signal representative of the original, comprising alternate samples of picture information. These alternate samples can then be transmitted unencoded over a half-bandwidth channel. At the receiver, the alternate samples are extracted from the received continuous wave, the missing samples are derived by means of a variant interpolation system, and the two sets of samples are combined to produce a replica of the original signal. In another simple embodiment, no actual sampling is needed beyond that effectively accomplished by the conventional television scanning operation. Accordingly, alternate fields are discarded and the retained fields are held in a storage device so that they may be read out and transmitted at half speed. At the receiver, the recovered fields are again stored, read out at normal speed, and combined with the fields which have been produced by means of a variant interpolator to replace the missing fields.

The invention, its objects and advantages will be better understood by referring to the following more detailed description taken in connection with the accompanying drawings, in which.

Figure 1:
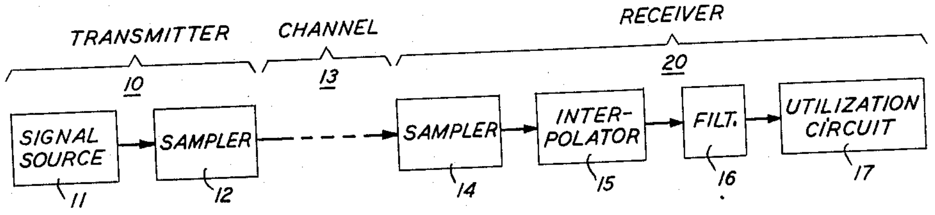
Fig. 1 is a schematic block diagram of a transmission system in accordance with the invention in one of its embodiments.

Referring now to the drawings, Fig. 1 shows an alternate sampling and interpolation system including a transmitter 10, transmission channel 13, and receiver 20. A message signal to be transmitted, which may be, for example, a conventionally generated video signal originating in signal source 11, is repeatedly sampled at a reduced rate by a sampler 12. If the signal originating at source 11 is a television signal band-limited to 4 megacycles, it is in accordance with the invention to sample this signal at a 4-megacycle rate, this being one half the sampling rate which, according to the well-known sampling theorem is required to prevent any substantial loss of information. The resulting spectrum is periodic on the frequency scale with a 4-megacycle interval. For example, if $T(\omega)$ denotes the spectrum of the original television signal and $S(\omega)$ represents the spectrum of the sampler output, then $$S(\omega)=\sum_{-\infty}^{\infty}T(\omega+n\omega_0)$$

where $n$ takes on all integral values, and where $\omega_0=2\pi$ times the sampling frequency which, in this case, is 4 megacycles. From the periodic nature of $S(\omega)$ and the fact that $T(\omega)=\bar{T}(-\omega)$, it follows that $$S\left(\frac{\omega_0}{2}+\omega\right)=\bar{S}\left(\frac{\omega_0}{2}-\omega\right)$$

It is thus apparent that the sampler output spectrum has conjugate symmetry about one half the sampling frequency. This indicates that not only is all of the essential information in the sampler output contained in the zero to 2-megacycle interval, but also that the cut-off of the channel used to transmit this information may be of the vestigial form oriented about the 2-megacycle or $$\frac{\omega_0}{2}$$

point. It will be apparent that this is the result obtained from elementary sampling theory. Thus, half-rate samples produced at the transmitter may be transmitted unencoded, over a half-bandwidth channel. Complex terminal equipment is not necessary for transmitting a signal of this sort.

At the receiver station the received continuous signal wave is applied to a sampler 14 and resampled at a 4-megacycle rate to produce a succession of signal samples identical to those obtained from sampler 12 in the transmitter 10. These samples are then operated on by interpolator 15, wherein the missing samples are developed, and intercalated in the recovered sample sequence to produce a wave train containing samples occurring at an 8-megacycle rate. Thus, interpolator 15 fills in the missing samples of the received wave train and supplies as an output signal a wave train of 8-megacycle amplitude modulated pulses, whose envelope contains the intelligence of the message signal.

If a continuous wave message is the desired output, the recovered wave train of pulses may be fed to a low pass filter circuit 16, which operates in accordance with established electronic techniques to yield a continuous wave. This continuous wave, which is substantially equivalent to the original message signal, may then be applied to utilization device 17.

To the extent that the interpolator in the receiver is successful, the output signal is substantially a replica of the input message signal and may conceivably even represent an improvement on the original signals inasmuch as the noise inherent in the signal may be reduced without an accompanying loss of detail. The latter possibility of actually improving the signal results from the fact that the system relies on individual interpolation rather than just on average predictability. Moreover, the criterion of successful interpolation is not merely how well the derived interpolation signal matches the original noisy signal, but rather how pleasing the final result is to an observer. It is this concept that, in part, marks the departure of the present invention from the prior art prediction-error encoding systems.

The sampling circuit 12 can, for example, be of the type described in an article entitled "An Experimental Multichannel Pulse Code Modulation System of Toll Quality," by L. A. Meacham and E. Peterson, published in the Bell System Technical Journal, vol. 27, No. 1 for January, 1948, in connection with Fig. 12–*b* at page 27. It should be pointed out that no use is made in the system described in connection with Fig. 1, of the high order beat-frequencies contained in the output of sampler 12. Hence, instead of sampling the input message signal, it may equally well be modulated on a carrier signal to achieve the desired result. If non-variant interpolation is to be used at the receiver, the sampling everywhere may be replaced by such a modulation process. However, the variant interpolation methods to be described hereinafter, make actual sampling at the receiver desirable.

In accordance with the invention, the sampling operation at the receiver must occur at the same frequency and phase as the corresponding operations at the transmitter. While any well-known signal synchronizing system may be employed to insure synchronization, one preferred method is to employ the burst technique now used in N.T.S.C. color television broadcasting. For example, a 2-megacycle burst signal may be transmitted during the interval immediately following the horizontal synchronizing pulse, commonly referred to as the "back porch," to lock a local oscillator in the receiver to the sampling frequencies of the transmitter. Alternatively, the entire horizontal blanking period may be used to support the burst signal and the line synchronizing signals may be reinserted at the receiving terminal. While any of the well-known methods of burst signal insertion may be employed, a simple and convenient means of introducing the burst is to key in alternate pulses from the sampling carrier signal during the blanking interval.

Figure 2:
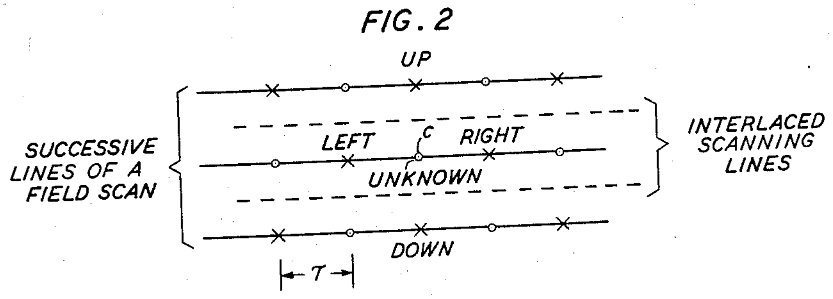
Fig. 2 is a pictorial diagram, illustrating the spatial relationship of samples in a portion of the raster of a television picture, useful in explaining the operation of the invention.

As mentioned above, it is in accordance with the invention to employ a variant system of interpolation at the receiver station. In Fig. 2, a variety of interpolation modes are illustrated which may be employed in the system of Fig. 1 to fill in the missing samples of the received signals. This figure shows pictorially a portion of the raster of a television picture and the spatial relationship of a typical sample point to its surroundings. The scanning lines of the even field are shown as solid lines and the scanning pattern of the odd field is shown in dashed lines. An array or matrix of typical sample points of a single field is illustrated, the selected elements being distributed along the scanning pattern. Crosses represent the transmitted samples occurring at $4 \times 10^6$ *pulses* per second, and circles represent the samples omitted because of the low rate sampling. The staggered relationship between the transmitted samples on adjoining lines of one field is obtained by selecting the sampling frequency to be an odd half-multiple of the horizontal line scanning frequency. Since there are an odd number of lines in each frame, the transmitted samples and the missing samples will be interchanged on successive frames. This horizontal displacement may be avoided, of course, by shifting the sampling carrier frequency by 180 degrees between successive frame scans.

In the matrix of Fig. 2, the unknown, or missing element is illustrated together with the four neighboring known sample points, labelled "Up," "Down," "Left," and "Right," which form a diamond with horizontal and vertical diagonals passing through the "Unknown" point. One method for estimating the value of the unknown sample is to average the values for surrounding samples. An averaging process of this type constitutes linear non-variant interpolation and, although a 2 to 1 reduction in channel capacity is achieved by this expedient, it results in a certain amount of detail loss in both the horizontal and vertical direction. Nevertheless, interpolation of this sort represents a useful method for exchanging bandwidth for resolution in two directions without requiring any change in the scanning system. The variant interpolation systems according to the invention substantially avoid the detail loss inevitable with non-variant methods.

Variant interpolation methods achieve this improvement by depending upon the assumption that within small areas of the picture, that is, within areas extending over but a few times the scanning line pitch, the brightness distribution consists of contours having approximately a fixed orientation. Therefore the simplifying assumption that small area brightness contours are either approximately horizontal or vertical, may be made. By again referring to Fig. 2 it is evident that the absolute value of the difference between the "Up" and "Down" samples may be formed and designated $|U-D|$, and, similarly, the absolute difference between the "Right" and "Left" samples, $|R-L|$ may be produced. If the difference between the vertical samples, that is $|U-D|$, is the smaller, a generally vertical local contour is presumed, and a vertical average, $$\frac{U+D}{2}$$

is used for the missing sample. Conversely, if $|R-L|$, the absolute difference between the horizontal samples is the smaller difference, a generally horizontal local contour is presumed and a horizontal average $$\frac{R+L}{2}$$

is used. In either case, the interpolation is carried out substantially parallel to the equal brightness contours, thereby minimizing blurring of the picture detail.

Alternatively, the available interpolation modes may employ a single value to represent the missing sample signal value. Thus, if the vertical difference $|U-D|$ is the smaller, then either U or D alone, or a random selection of the two may be used as the missing value. If $|R-L|$, the horizontal difference, is the smaller value, then either R or L alone or a random selection of the two may be assigned. While a "one-sided" interpolation of this type will result in less blurring than the averaging type of interpolation, there may however be an increased tendency to produce a moiré pattern.

In any of the above-mentioned interpolation modes, it is evident that the interpolation pattern or matrix translates along through the array of samples as the scanning proceeds. Moreover, in accordance with the invention, the selected interpolation mode varies from point to point throughout the picture in dependence upon the nature of the local picture environment. It is thus entirely feasible and economical to produce a plurality of possible interpolation values or modes, and then choose that one which best is representative of the missing sample at any given point. In instrumenting such a variant system it is obvious that the complexity of the interpolating equipment increases as the number of possible fill-in values increases.

Figure 3:
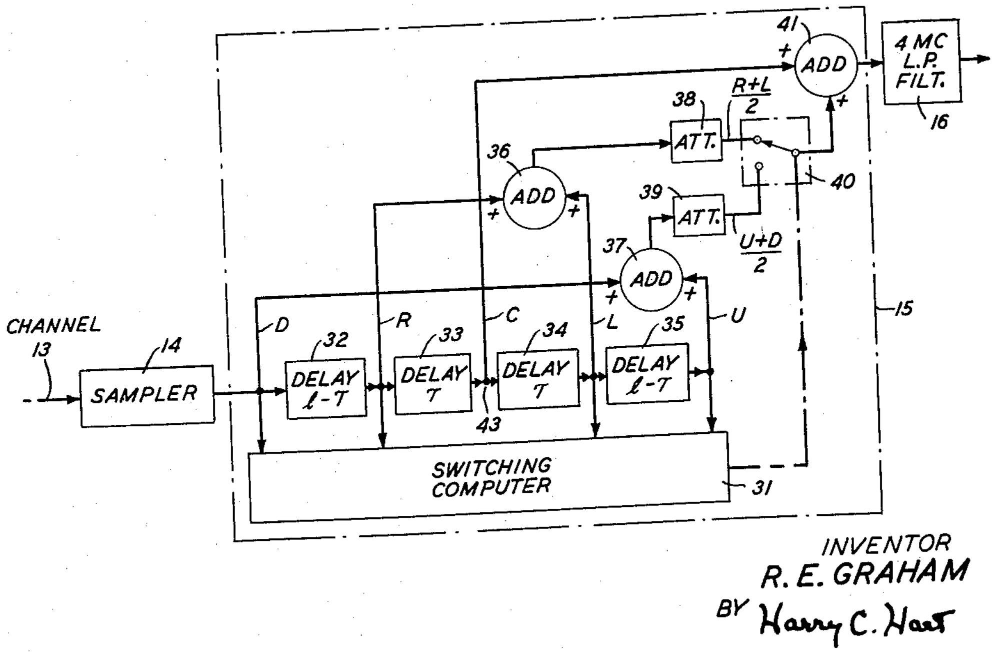
Fig. 3 is a schematic block diagram of an illustrative arrangement of a dual-mode interpolation circuit suitable for use in the system of Fig. 1.

The block diagram of a dual-mode variant interpolating receiver suitable for use as the interpolator 15 of receiver 20 of Fig. 1, is shown in Fig. 3. The continuous succession of half rate samples originating in the receiver sampler 14 are fed to a substantially lossless delay network including serially connected delay elements 32, 33, 34, and 35, which elements are so arranged that the U, D, R, L, and C sample elements of the local picture matrix are produced. Alternatively, a single delay network tapped at a number of places along its length may be employed, Delay elements 32 and 35 provide delays of one line time $l$ minus a delay of an element time $\tau$, or about 63.3 microseconds. Large delays of this type may be obtained by the use of magnetic storage devices, electronic storage tubes, or by means of fused silica elements of a type well known in the art. The delay elements 33 and 34 insert delays of one picture element time each. These delay elements may be either lumped or distributed electrical delays of any well-known type. Samples representing the present signal value are produced at the terminal 43 and supplied directly to one input connection of a summing or adding stage 41. Signals appearing at the terminals R, L, and U, D, respectively, are paired in adders 36 and 37 to provide horizontal and vertical sums. Hence, the signal produced by adder 36 is equivalent to $R+L$ and the signal produced by adder 37 is equivalent to $U+D$. The signals are respectively supplied by way of attenuators 38 and 39, which convert the sums into simple average values, to the two terminals of electronic mode switch 40. By virtue of switch 40, only that one of the resulting signals, $$\frac{R+L}{2}$$

or $$\frac{U+D}{2}$$

selected as the best interpolation value of the missing sample, is supplied to the adder 41. Switch 40 is actuated, in turn, by a signal generated in a switching computer 31 which is supplied with the R, L, U, and D signals produced by means of the delay system. A comparison of $|R-L|$ and $|U-D|$, the absolute values of the difference between the "Right" and "Left," and "Up" and "Down" samples in the matrix of neighboring samples, indicates the general contour pattern of the picture, and accordingly which of the possible interpolation values is to be connected to adder 41.

While the electronic switch 40 may be of any suitable design, a preferred form of switch will be described in connection with Fig. 6.

It is apparent that the samples occur at the four points R, L, U, and D at times . . . 0, $2\tau$, $4\tau$, . . ., and at the center point C at times . . . $\tau$, $3\tau$, and $5\tau$ . . . . Hence, the received samples and the interpolated samples are properly intercalated at the output of the adder 41 to provide a train of $8\times10^6$ samples per second. This train may be subsequently applied to the low pass filter 16 to produce a continuous output signal.

Figure 4:
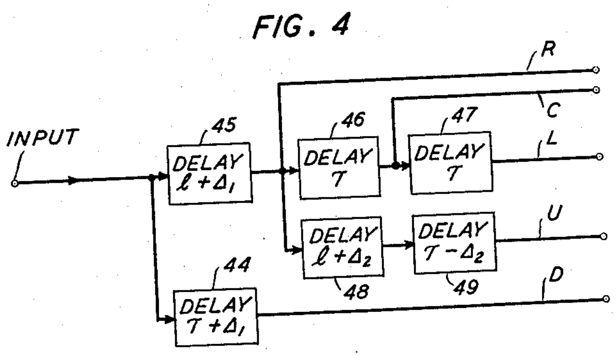
Figs. 4 and 5 are schematic block diagrams of delay systems suitable for use in the invention.

As described above, the several signal samples comprising the matrix are produced by means of the delay elements 32 through 35. This arrangement is the simplest storage network for obtaining the five sample positions and employs delay units of fixed delay times. It is to be understood, however, that other delay elements, for example, commercially available units with preassigned delay times may be employed. In such a situation, the delay times may not be the precise ones required for proper timing of the sample positions. If the available line time delay exceeds the value $l-\tau$, various other arrangements may be used to produce the necessary sample values. Fig. 4 shows a suitable network for use when the delay elements available produce delays which exceed a line time by times $\Delta_1$ and $\Delta_2$, respectively, where $\Delta_1<\tau$. For example, the delay element 45 may have a time delay of $l+\Delta_1$ and the element 48 a delay $\tau+\Delta_2$. In this case, the delay system must branch twice instead of forming a single flow path as in Fig. 3. Accordingly, passage of the input signal through delay element 45 produces the sample position or location R. A further delay of time $\tau$ by element 46 produces C, and an additional delay of $\tau$ in element 47 produces position L. Proceeding from the R tap through delay elements 48 and 49 having delay times respectively, of $l+\Delta_2$ and $\tau-\Delta_2$, the location U is produced. D is produced by delaying the input signal $\tau+\Delta_1$ in element 44.

Figure 5:
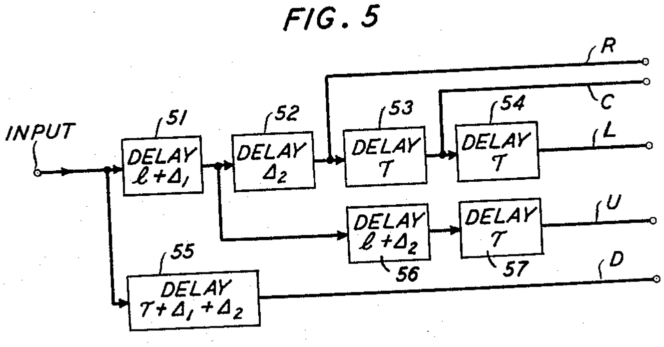

When the available delay elements are such that $\Delta_2>\tau$, the branching network of Fig. 5 may be employed. This network is in all respects similar to that of Fig. 4. It is to be understood that numerous other branching networks may be employed to produce the required matrix values when fixed delay time units are employed, thus making commercially available components manifestly suitable for use in the invention.

As pointed out above, it is in accordance with the invention to employ a variant means of interpolation which causes the interpolation pattern or mode to vary from point to point in the picture in dependence upon the local picture environment. Having produced a number of possible interpolation modes, a switching computer is employed to select that mode which at any given time probably represents the best interpolation value. Fig. 6 illustrates a simple and convenient interpolating receiver suitable for producing two interpolation modes together with a suitable switching computer.

Figure 6:
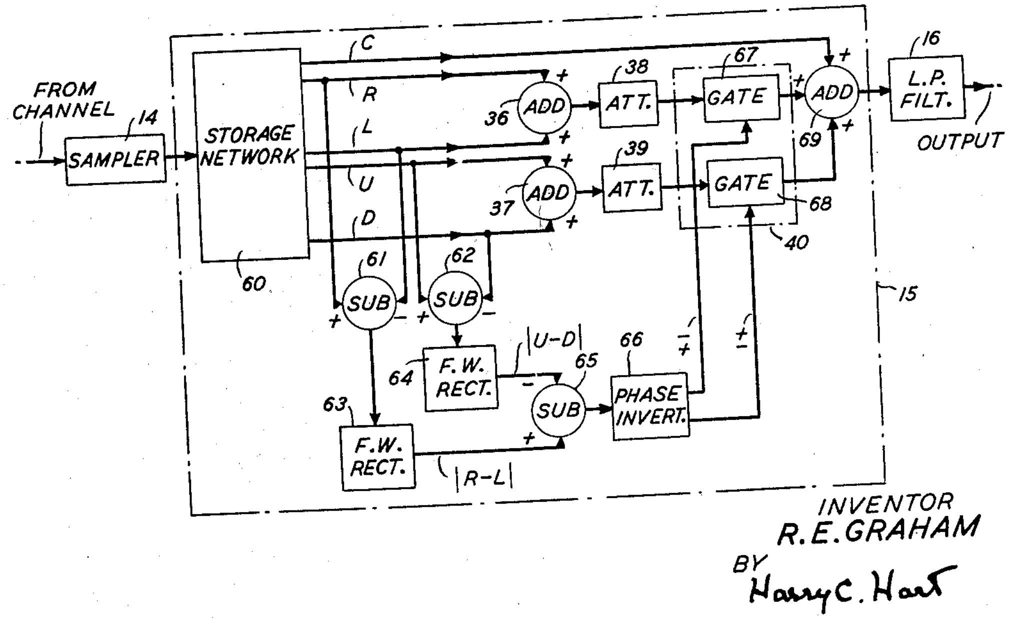
Fig. 6 is a schematic block diagram of an interpolation receiver in accordance with the invention.

In Fig. 6, the received signal is sampled prior to application to a storage network 60 as heretofore described in connection with Fig. 3. The storage network 60 produces a set of five signals representing samples having the relative positions C, R, L, U and D as illustrated in Fig. 2. The samples appearing at C are applied directly to the adder 69 while the remaining signals R, L, U, D are supplied in pairs to the adders 36 and 37 to produce the sums $R+L$ and $U+D$, respectively. The sums are then attenuated in attenuators 38 and 39 to produce, respectively, the simple average values $$\frac{R+L}{2}$$

and $$\frac{U+D}{2}$$

these being the simple horizontal average and vertical average interpolation values. These signals are then applied to the gates 67 and 68. According to the contour pattern of the picture as determined by the computer, one or the other of these gates permits one of these signals to be applied to the adder 69, there to be added to the received alternate samples. The resulting completed train of samples is then smoothed by a low pass filter 16 to form a continuous output signal.

In order to activate the gates 67 and 68 which take the place of the switch 40 in Fig. 3, a determination is made of the probable changes occurring in the signal. This is accomplished by combining the values R and L in subtractor 61 to produce a difference signal, and combining the values U and D in subtractor 62 to produce another difference signal. The difference signals are passed through full wave rectifiers 63 and 64 to produce the absolute values of these difference signals prior to their application to a subtractor 65 wherein the algebraic difference of these absolute value signals are produced. Thus, rectifier 64 supplies the value $|U-D|$ to subtractor 65 and rectifier 63 supplies $|R-L|$ to the same subtractor. The resulting difference signal is then applied to phase inverter 66 which provides secondary difference signals of both polarities, i.e., $|R-L|-|U-D|$ and $|U-D|-|R-L|$, which signals in turn act as the keying signals to activate gates 67 and 68. Gates 67 and 68 may be of the simple diode type disclosed in Patent 2,576,026, granted to L. A. Meacham, November 20, 1951. Thus, a positive voltage supplied from the phase inverter 66 applied to gate 67 (and hence a negative voltage applied to block gate 68) opens it and permits the interpolation value $$\frac{R+L}{2}$$

to be supplied as the output value. When the positive value appears at gate 68, the conditions are interchanged and $$\frac{U+D}{2}$$

is supplied to the adder 69.

In the interpolation receiver of Fig. 6, sampling of the received signal is carried on prior to the signal delay operation. This may place an undue bandwidth requirement on the delay units in the storage network. In order to further insure that readily obtainable delay elements may be employed, the receiver shown in Fig. 7 may be used. Here, essentially the same operations are performed without initial sampling. In this case, sampling takes place after the interpolation values have been formed and after the control signal output of the switching computer has been produced. Thus, the signal transmitted through the storage network is a narrower band signal, confined, in the example given above, to a two-megacycle frequency band. While a number of samplers are required in this embodiment instead of one, nevertheless this may be an advantage from the construction standpoint.

Figure 7:
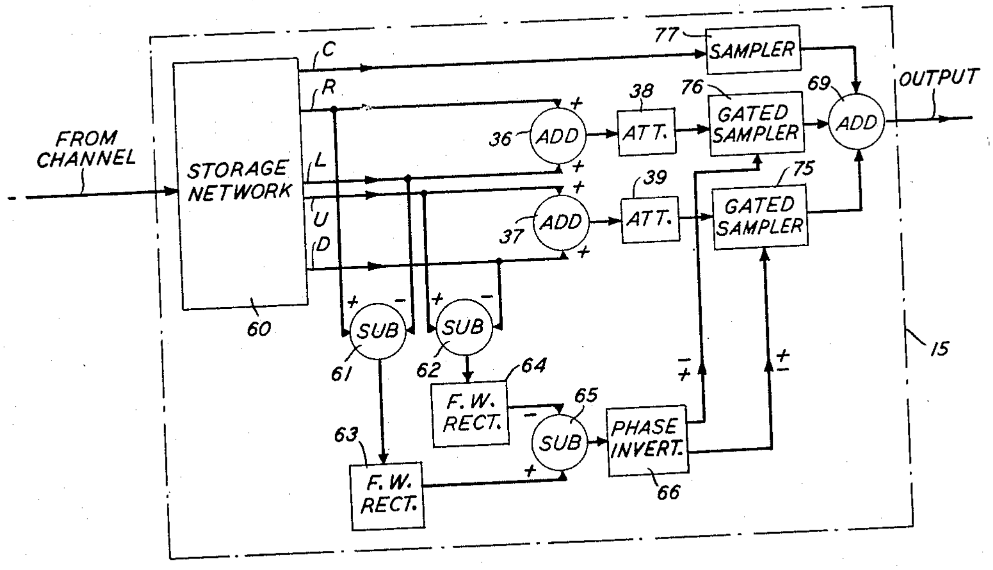
Fig. 7 is a schematic block diagram of a system alternative to that of Fig. 6.

Since the point C in the signal matrix is displaced by an odd multiple of $\tau$ from the set R, L, U, and D, the arrangement of Fig. 7, wherein sampling is postponed, requires different timing for the interpolation samplers 75 and 76 than that used in the sampler 77 for the transmitted signal. However, this is easily achieved by proper selection of the timing signals according to well known techniques.

In those cases in which the secondary difference signals are of considerably smaller amplitude values than are available in either of the previously described units, that is, in picture areas where the secondary difference $|U-D|-|R-L|$ is too small to operate decisively one or the other of the two gates, the difficulty can be minimized by amplifying and clipping the final difference signal so that it closely approximates a binary signal. Similarly, by inserting a regenerative bistable stage in the control path, positive operation is achieved. In addition, the gates may be so designed that a zero control voltage results in a simple four-way average $$\left(\frac{R+L+U+D}{4}\right)$$

this signal being transmitted to the output. This might well be the most acceptable interpolation in indecisive regions.

Figure 8:
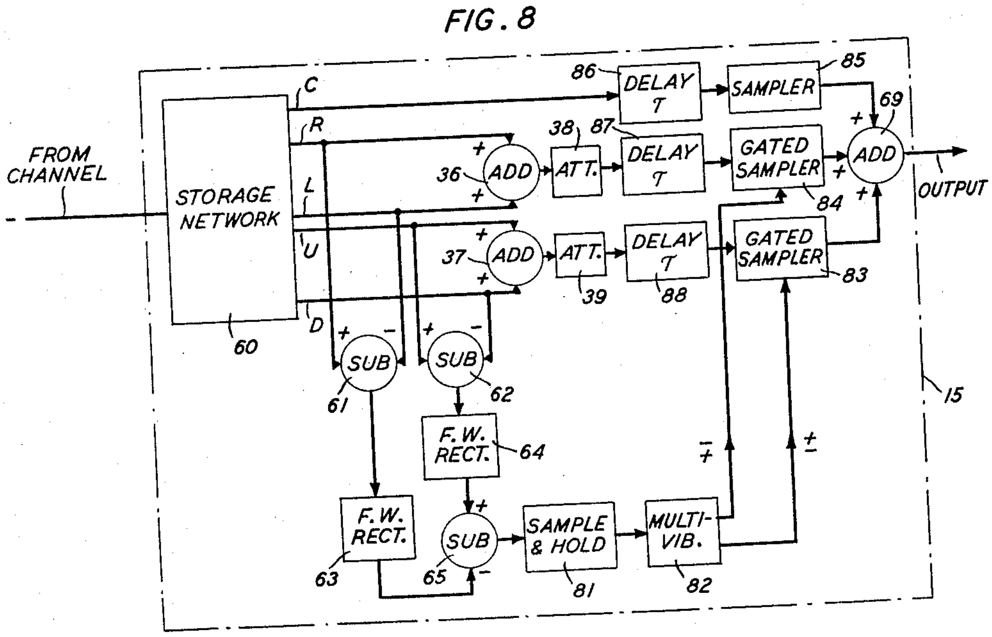
Fig. 8 illustrates still another interpolation receiver in accordance with the invention.

An alternative computing arrangement for use in systems wherein the secondary difference signals are small, is illustrated in Fig. 8. Here, each signal portion is delayed first to permit an examination to be made of the neighboring matrix values prior to the time at which a decision is to be made. Thus, additional delay elements 86, 87 and 88, each having an element delay time $\tau$, are inserted in the several signal paths prior to sampling. In this arrangement, the secondary difference signal output of subtractor 65 is applied to a sample-and-hold circuit 81 wherein the difference signal values are held for an interval just less than $2\tau$. The output of this stage, which is either positive or negative depending on the sign of the difference signal, is used to control the state of a bistable multivibrator 82 whose output enables one or the other of the interpolation gates 83 and 84. Because of the added delay in the several signal paths, the interpolation samplers, when activated by the multivibrator output, must sample at times . . . $\tau$, $3\tau$, $5\tau$, . . . that is, at a time $\tau$ later than the start of the sample-and-hold operation. Hence, the multivibrator 82 is provided with an energizing signal throughout the time interval $\tau$ in order to insure a positive "lock" in one of its stable states. This time allowance, together with the bistable property of the multivibrator avoids the possibility of a partial enabling of the gates 83 and 84 if the change of state of the multivibrator is reasonably fast.

Various other means for insuring a positive gating action may be employed. For example, the hold process may be eliminated if the multivibrator is suitably arranged to respond to very short sample pulses. Alternatively, the multivibrator may be a.-c. coupled, having only one stable state to which it returns before the occurrence of each new triggering pulse. Thus, an input pulse of one polarity will leave the multivibrator undisturbed, that is, in its stable state, while the other polarity of input pulse will trigger the multivibrtor into its unstable state where it will remain until the appropriate interpolation sample has been allowed to pass through the proper gate. The added $\tau$ delays may, of course, be assigned any other desired value between zero and $2\tau$, and the timing of the computer samplers adjusted accordingly to provide different degrees of time margin for the multivibrator.

While the foregoing systems have been described as two-mode systems, in which a choice of only two interpolation modes is available, it is to be understood that other modes may be made available by using more remote sample points in the picture area surrounding the unknown point. Moreover, the rule governing the selection of modes need not necessarily be based on the contour line concept. Thus, it is within the ambit of the invention to employ interpolation modes based on the planar, slope, or circulation prediction theories as discussed by C. W. Harrison in an article entitled "Experiments With Linear Prediction in Television" published in the Bell System Technical Journal, vol. 31, July 1952, at pages 764 through 783. While the methods therein described are confined to predictions based entirely on the past, it is within the scope of this invention to employ a linear combination of many points for the interpolation. Of course, if future values are used, explicit information identifying the mode in use must be transmitted to the receiver station.

Although each of the embodiments heretofore described is particularly well adapted for use with signals consisting of a succession of samples, the concepts of the invention may be equally well applied to a system not dependent for its effectiveness upon signal sampling. Specifically, if facilities are available both at the transmitter station and at the receiver station for storing a full television field, it becomes both feasible and economical to employ variant interpolation to achieve a substantial reduction in transmission channel capacity. A system of this sort is illustrated in Fig. 9.

Figure 9:
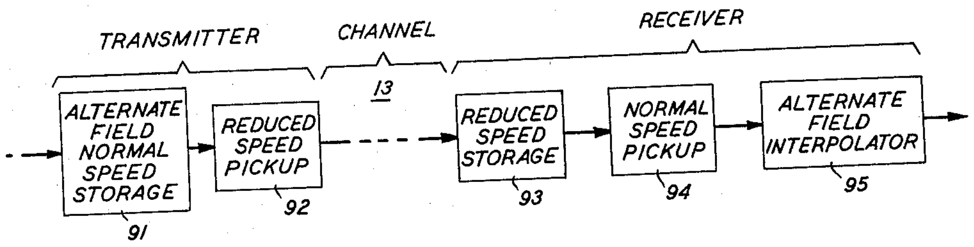
Fig. 9 is a schematic block diagram of a simple illustrative embodiment of an alternate field interpolation transmission system.

In the arrangement of Fig. 9 every other field of a standard 4-megacycle television signal is stored in device 91, which may be, for example, a suitable storage tube or magnetic drum device, and the remaining fields are discarded. Each stored field is then rescanned or read out at one half the normal rate in pickup unit 92, which may be a part of the device 91, thereby stretching the retained field signals to produce an output signal confined to a two-megacycle band. Erasure of the stored information following each rescanning operation may be accomplished either by the writing or reading operation or by means of other well-known erasing techniques. The signal is then transmitted over a two-megacycle wide channel 13 to a receiver station where it is again stored in a storage device 93 at one half the normal rate. The stored signal is then rescanned twice at the normal pickup rate in pickup unit 94 (again a magnetic drum device or suitable storage tube in combination with device 93) to produce a 4-megacycle, 60 field per second signal. Successive fields, of course, occur in identical pairs. The erasure of stored information preferably is accomplished by the writing operation. The recovered signal produced by pickup unit 94 is then supplied to alternate field interpolator 95 which alternately supplies as an output an unchanged normal field signal and an interpolated value of an interlaced field which is derived from the repeated adjacent normal field. The resultant signal is a substantial replica of the original signal supplied to the transmitter and may be supplied to any convenient utilization device.

It is apparent that by means of a similar series of operations, band reduction of any magnitude may be achieved commensurate with recovery signal accuracy. For example, a 4 to 1 bandwidth reduction may be obtained by storing every fourth field in device 91, rescanning at one fourth normal speed in pickup 92 to produce a 1-megacycle signal for transmission. The receiver storage unit 93 then stores the received signal at one fourth speed, while rescanning in pickup 94 occurs at four times normal speed. The subsequent operation of alternate field interpolator 95 is identical to that described in the half speed system, the difference between the performance in the two systems being that the first provides 30 and the second only 15 cycles per second motion portrayal. In each case the flicker rate is the normal 60 cycles per second. Alternatively, both the received field and the interpolated field may be repeated the required number of times.

Figure 10:
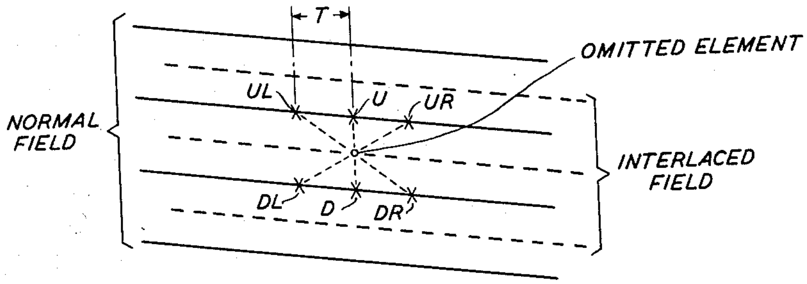
Fig. 10 is a pictorial diagram helpful in describing the alternate field interpolation system of Fig. 9.

Before referring specifically to the instrumentation of the alternate field interpolator, it will be of value to again examine the spatial relationship of a matrix of picture elements in a conventional television scanning raster. In Fig. 10 a typical point on one of the omitted interlaced lines is shown together with a number of surrounding points in the normal field, i.e., the field that is transmitted. Six surrounding points, UL, U, UR, DL, D, and DR are shown arranged so that there are three possible interpolation directions spaced apart by 60 degrees. Assuming adjacent picture elements to occur at $\tau$ intervals, where $\tau$ represents a Nyquist interval, the horizontal separation between adjacent points is about $$T=\frac{2\sqrt{3}}{3}\tau$$

or roughly 0.15 microseconds. It is apparent that these points may be freely chosen inasmuch as no sampling structure exists along the scanning lines, a freedom not present in the alternate sample systems described above.

Alternate field interpolation is in many respects analogous to alternate sample interpolation. Thus a simple average of all the surrounding points could be used for the missing signal, resulting in both horizontal and vertical blurring in exchange for bandwidth reduction. A preferred embodiment makes use of the variable mode method such that one of a number of possible interpolation values is selected at any instant as the best value representive of the missile sample. A simple determination of the smallest point to point signal change is effectively employed as the mode selection rule.

It will be apparent that due to the odd-line interlaced structure used in most standard television systems, a half line effective time advance must be applied to the repeated normal field to obtain a cluster of points surrounding the missing point to be estimated. Actually, in order to include a future signal value DR, this advance must be a half line time plus the interpolator spacing time T.

Figure 11:
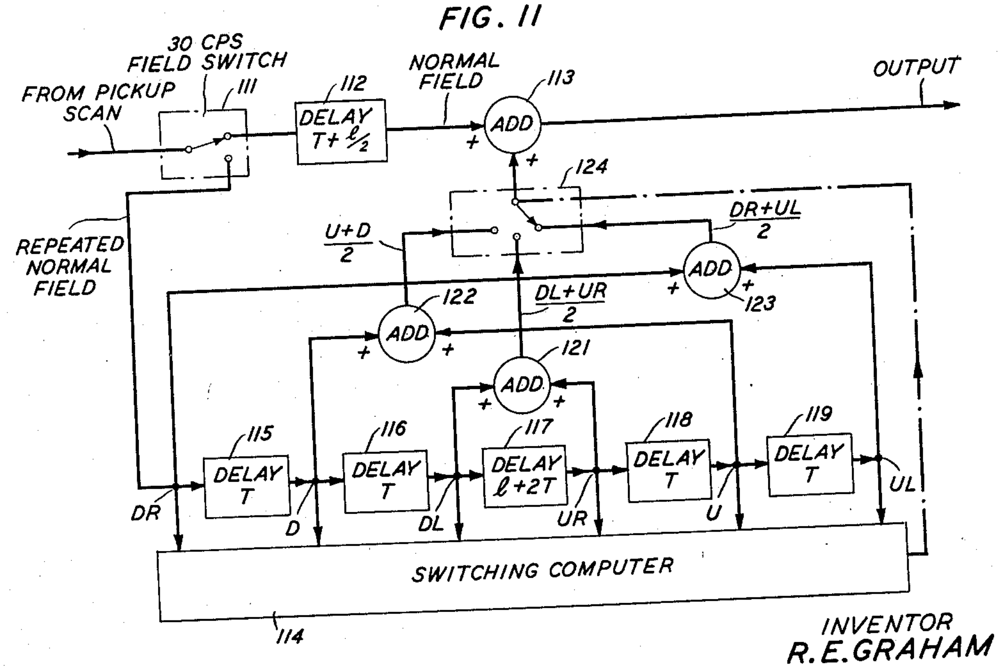
Fig. 11 is a schematic block diagram of one form of a multi-mode interpolation computer suitable for use in the system of Fig. 9.

One arrangement of the alternate field interpolator 95 is illustrated in Fig. 11. The signal composed of consecutive pairs of normal field signals is supplied to a 30 cycles per second field selector switch 111 which routes the initial normal field signal of each pair to the upper path including delay unit 112 and adder 113, and routes the second or repeated field signal to the lower path. The lower path includes a substantially lossless delay network, comprising serially connected delay devices 115 through 119, which provides, in a manner analogous to the network shown in Fig. 3, the six points surrounding the point to be estimated. Outputs from the six taps included in the delay network are paired in adders 121, 122 and 123 to form three directional interpolations, each of which is a simple average along one of the three directions. With the surrounding points chosen from the pattern of Fig. 10, these directional interpolation values are respectively $$\frac{DL+UR}{2},\ \frac{U+D}{2},\ \text{and}\ \frac{DR+UL}{2}$$

These values are applied to the poles of electronic switch 124. The several signals derived from the delay network are also applied to switching computer 114 which, as described above, compares the three appropriate differences, selects the interpolation mode signal probably best representative of the missing value, and activates switch 124, accordingly, to supply that interpolation value to adder 113. As mentioned above, a delay 112 is inserted in the normal field path to provide an effective time advance of $T+l/2$ for the retained fields.

The selected interpolation signal which changes from point to point as the scanning progresses, is combined in adder 113 with the initial normal field signals of each pair to produce a resultant succession of normal and interlace fields forming a complete approximation to the original signal.

Figure 12:
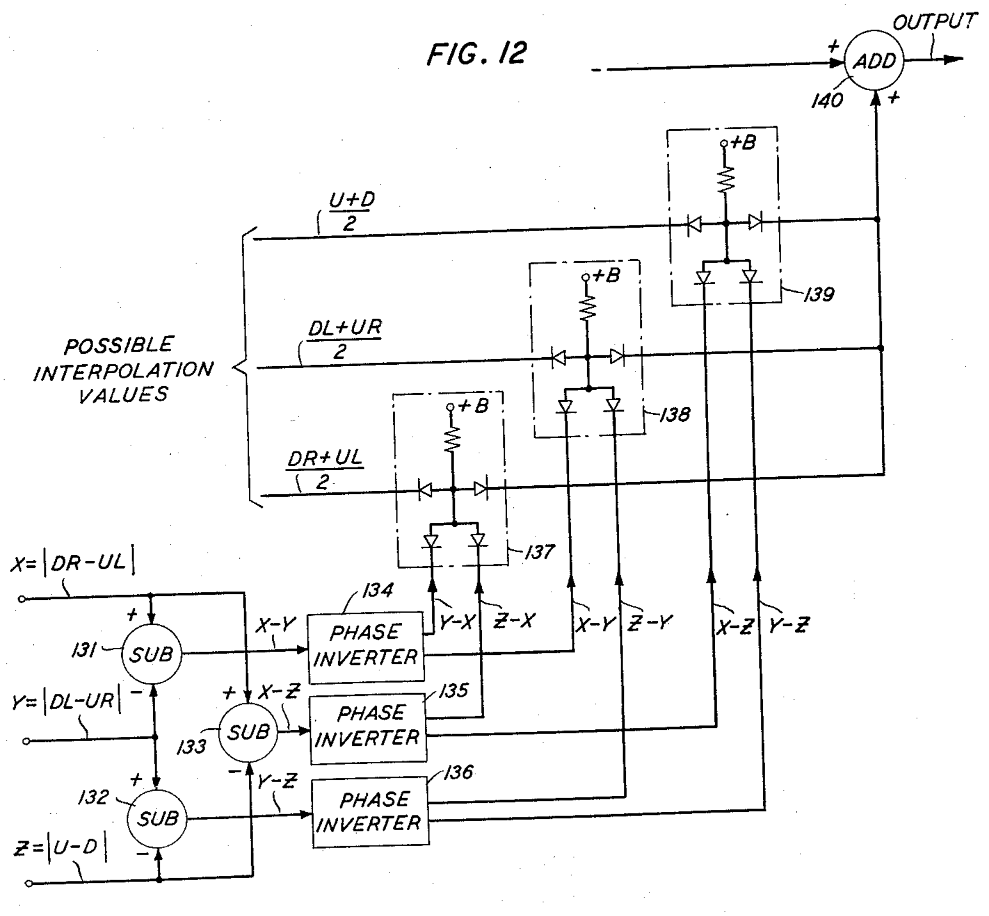
Fig. 12 shows partly in block diagram form and partly in schematic diagram form a three-mode switching computer for use in the invention.

Some of the details of switching computer 114 are illustrated in Fig. 12. In this computer, the three absolute differences |DR—UL|, |DL—UR|, and |U—D|, for convenience denoted respectively X, Y, and Z, are cross-compared by pairs in subtractors 131, 132, and 133 to form three secondary differences. Phase inverters 134, 135 and 136 are then used to supply both polarities of these secondary signals, providing six signals in all. These six control signals are then connected to three interpolation gates 137, 138 and 139, each having two "And" type control inputs. Gates of this type are well known in the art. Only the gate having two positive control inputs operates and transmits the applied interpolation value to the output. Generalization of the computer to $n$ prediction modes evidently requires the use of $n$ gates, each with $n+1$ diodes. In some circumstances, cathode ray tube techniques might be desirable to accomplish some of the necessary switching in preference to extensive diode arrays.

All of the elements employed in the several embodiments of the invention are well known in the art. For example, adders and subtractors can be simple resistance or electronic networks supplied with the proper polarity of signals. A gated sampler may be simply a sampler of the type described in the aforementioned Meacham and Peterson article, activated by an appropriate enabling pulse. Similarly, multivibrators and sample-and-hold circuits have been completely described in the literature.

While the invention has been described in connection with various illustrated embodiments, many other variations in the interpolation technique may be devised by those skilled in the art without departing from the spirit and scope of the invention. For example, it is obvious that there is a wide choice of detailed interpolator operating rules for use in either the alternate sample or the alternate field systems. Moreover, both the alternate field and alternate sample systems may be combined to afford an even greater bandwidth reduction. Additionally field storage may also be used with the alternate sample system to obtain a more tightly knit cluster of surrounding points thereby to improve the interpolator accuracy.

What is claimed is:

1. A narrow band signal transmission system which comprises, at a transmitter station, means supplied with a message signal for sampling said signal at periodic sampling intervals thereby to derive message samples, means for transmitting to a receiver station selected ones of said message samples, means at said receiver station supplied with received selected message samples for deriving therefrom a plurality of message samples representing respectively each sample not selected for transmission, means supplied with said derived message samples for choosing one of said plurality of derived message samples for each of said samples not selected for transmission, and means for combining said received selected message samples and said chosen samples to provide an output signal.

2. Television transmission apparatus which comprises a source of television signals consisting of a succession of picture signal elements, means for eliminating certain individual ones of said picture signal elements to leave blank intervals, means for transmitting the remaining picture signal elements to a receiving station, means at said receiving station for deriving from the received picture signal elements a plurality of picture signal elements representative of the value of each one of said picture signal elements eliminated prior to transmission, means for intercalating respectively a selected one of said plurality of picture signal elements in each of said blank intervals.

3. A television transmission system which comprises at a transmitter station a source of television signals consisting of a succession of picture signal elements, means supplied with said succession of picture signal elements for sampling said succession at periodic sampling intervals thereby to derive signal samples, means for eliminating certain individual ones of said signal samples to leave blank sample intervals, means for transmitting the remaining signal samples to a receiver station, means at said receiver station supplied with the received signal samples for deriving therefrom a plurality of signal samples each representative respectively of one of said signal samples eliminated at said transmitter station, means supplied with said derived samples for selecting one of said plurality according to a predetermined rule based on the statistics of said received signal samples for each of said blank sample intervals, and means for respectively intercalating said selected derived samples in said blank sample intervals.

4. Television transmission apparatus which comprises a source of television signals consisting of a succession of picture signal elements, means for eliminating certain individual ones of said picture signal elements to leave a succession of picture signal elements interspersed with blank picture signal element intervals, means for modifying said picture signal elements retained to occupy the interval formerly occupied by said retained picture signal elements and said blank picture signal element intervals, means for transmitting said modified picture signal elements to a receiving station, means at said receiving station for restoring the received modified picture signal elements to form a succession of picture signal elements interspersed with blank picture signal elements, means for deriving from said succession of received picture signal elements a plurality of picture signal elements representative of the value of each of said picture signal elements eliminated prior to transmission, means for selecting one of said plurality of derived picture signal elements in accordance with a rule based on the statistics of said succession of received picture signal elements, and means for respectively intercalating said succession of received picture signal elements and said selected derived picture signal elements to form an output signal.

5. A transmission system which comprises at a transmitter station a source of message signals, means supplied with said message signals for sampling said message signals at periodic sampling intervals thereby to derive message samples, said periodic sampling interval being substantially the time interval $1/\omega$ where $\omega$ is the bandwidth of the message signal, means for transmitting said message samples to a receiver station over a channel having a bandwidth of $\omega/2$, means at said receiver station for sampling the received message signal at periodic sampling intervals identical to those employed at said transmitter station thereby to derive received message samples, means for deriving from said received message signal a plurality of successions of message signal samples, the samples of each succession occurring at time intervals of $1/\omega$, means for selecting one of said plurality of derived successions of picture signal elements in accordance with a rule based on the statistics of said received message signal, and means for respectively intercalating said selected derived succession of samples, and said received message signal samples to produce an output signal.

6. A transmission system according to claim 5 in which the message signal is a television signal in which the sampling interval is substantially the time interval $1/\omega$ where $\omega$ is the bandwidth of the television signal, and the plurality of successions of derived samples at said receiver station includes samples selected from successive lines of a field scan.

7. A system for the communication of the intelligence of an original message wave comprising means supplied with a regularly spaced succession of signal periods interspersed with blank periods for deriving a number of signals according to various modes of interpolation for each of said blank periods, computing means for selecting, for each one of said blank intervals, one of said modes of interpolation in accordance with a rule determined by message wave statistics, and means for intercalating said interpolation signals selected in accordance with said rule with said succession of signal periods to produce an output signal.

8. A system according to claim 7 in which said original message is a television wave, and said signal periods and said blank periods each are substantially $\tau$ seconds in duration where $\tau$ is one half the reciprocal of the bandwidth of the television wave.

9. A system according to claim 7 in which said original message wave is a television wave and said signal periods and blank periods each comprise television field periods.

10. Television transmission apparatus which comprises a source of television signals consisting of a succession of field signals, means at a transmitter station for eliminating certain individual ones of said field signals to leave blank field intervals, means for modifying each remaining field signal to occupy the time period formerly occupied by both the retained field signal and a corresponding blank field interval, means for transmitting said modified field signals to a receiver station, means at said receiver station for restoring said modified field signals to their original time periods thereby to leave blank field intervals corresponding to the field signals eliminated prior to transmission, means for deriving from each successive received field signal a plurality of picture signal elements representative of the value of each picture element of one of said field signals eliminated prior to transmission, means for selecting one of said plurality of picture elements to represent each corresponding picture element of said field signal eliminated, according to a rule based on the signal statistics thereby to form an interpolated field signal, and means for respectively intercalating said interpolated field signals in said blank field intervals to produce an output signal.

11. Apparatus for selecting that one of a number of reference signals which appears to most nearly resemble the value of an incoming signal which comprises means for analyzing said incoming signal into a plurality of individually identified components, means for analyzing each of said reference signals into a like plurality of similarly identified components, means for grouping said components of said incoming signal by pairs, means for forming a primary difference signal from each of said pairs, means for forming rectified signals from said primary difference signals, means for grouping said rectified primary difference signals by pairs, means for forming a secondary difference signal from each of said pairs of rectified primary difference signals, means supplied with each of said secondary difference signals for producing a plurality of modified secondary difference signals of both polarities, means responsive to selected pairs of said modified secondary difference signals for identifying each of said reference signals as having the characteristics of a particular one of said incoming signals, and means for selecting for transmission one of said reference signals according to said identification.

12. Apparatus as defined in claim 11 wherein the means for analyzing each reference signal comprises a group of serially connected delay elements whose delay periods are respectively proportioned to the several components of said reference signal.

13. Apparatus as defined in claim 11 wherein said means for selecting for transmission one of said reference signals according to said identification comprises a plurality of logic gate circuits each supplied respectively with one component of said reference signal and at least one of said secondary difference signals.

14. Television transmission apparatus which comprises a source of television signals consisting of a succession of picture signal elements arranged in a succession of field signal groups, means for storing selected alternate field signals at a first rate thereby omitting alternate field signals, means for removing said stored field signals from said storage means at a second rate, means for transmitting said field signals to a receiver station, means at said receiver station for storing said received field signals at said second rate, means for removing said stored field signals at said first rate, means for concurrently deriving from said received field signals a plurality of interpolated field signals representative of each one of said omitted field signals, means for selecting one of said plurality of interpolated field signals for each corresponding omitted field signal, and means for respectively intercalating said interpolated field signals and said received field signals to produce an output signal.

15. A transmission system which comprises, at a transmitter station, means supplied with a message signal for sampling said signal at periodic sampling intervals thereby to derive a continuous succession of message samples, means for discarding preselected ones of said samples, means for modifying each retained sample in the time domain to occupy the time period formerly occupied both by said retained sample and by a corresponding one of said discarded samples, means for transmitting to a receiver station said modified samples, means at said receiver station for restoring said modified samples to their original dimension in time to produce a facsimile of the transmitted wave including blank intervals corresponding to said discarded samples, means for interpolating solely from information in said restored samples a reconstruction of each discarded sample of said message signal, and means for intercalating said reconstructed samples with corresponding ones of said restored samples to yield a substantial replica of said message signal.

16. Television transmission apparatus which comprises a source of television signals consisting of a succession of field signals, means at a transmitter station for eliminating certain individual ones of said field signals to leave blank field intervals, means for modifying each remaining field signal to occupy the time period formerly occupied both by the retained field signal and a corresponding blank field interval, means for transmitting said modified field signals to a receiver station, and, at said receiver station, means for restoring said modified field signals to their original time periods thereby to leave blank intervals corresponding to the field signals eliminated prior to transmission, means for deriving from successive received field signals a plurality of interpolated field signals each one of which represents the value of one of the field signals eliminated prior to transmission, means for selecting one of said plurality of interpolated field signals, according to a rule based on signal statistics, to substitute for each corresponding field signal eliminated at said transmitter, and means for intercalating said interpolated field signals and said restored field signals to produce a composite output signal.

References Cited in the file of this patent

UNITED STATES PATENTS

| | | |
|---|---|---|
| 2,321,611 | Moynihan | June 15, 1943 |
| 2,629,010 | Graham | Feb. 17, 1953 |
| 2,629,011 | Graham | Feb. 17, 1953 |
| 2,652,449 | Graham | Sept. 15, 1953 |
| 2,740,912 | Graham | Apr. 3, 1956 |
| 2,786,887 | De France | Mar. 26, 1957 |